(12) United States Patent
Watanabe (10) Patent No.: US 11,244,465 B2
(45) Date of Patent: Feb. 8, 2022

(54) POINT CLOUD DATA PROCESSING DEVICE (71) Applicant: TOSHIBA TEC KABUSHIKI KAISHA, Tokyo (JP)

(72) Inventor: Koichi Watanabe, Kawasaki Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/899,736

(22) Filed: Jun. 12, 2020

(65) Prior Publication Data

US 2021/0142499 A1   May 13, 2021

(30) Foreign Application Priority Data

Nov. 7, 2019   (JP) ............................. JP2019-202383

(51) Int. Cl.
*G06T 7/55* (2017.01)
*G01S 17/08* (2006.01)
*G01C 3/14* (2006.01)

(52) U.S. Cl.
CPC ................ *G06T 7/55* (2017.01); *G01C 3/14* (2013.01); *G01S 17/08* (2013.01); *G06T 2207/10028* (2013.01)

(58) Field of Classification Search
CPC ... G06T 7/55; G06T 2207/10028; G01C 3/14; G01S 17/08
See application file for complete search history.

(56) References Cited

U.S. PATENT DOCUMENTS

| | | | |
|---|---|---|---|
| 9,927,222 B2* | 3/2018 | Suzuki | G01B 11/002 |
| 10,339,656 B1* | 7/2019 | Le | G06T 7/50 |
| 10,415,958 B2* | 9/2019 | Nakatsukasa | G01B 11/08 |
| 10,699,421 B1* | 6/2020 | Cherevatsky | H04N 7/181 |
| 10,706,571 B2* | 7/2020 | Sugimura | G06T 7/55 |
| 10,706,587 B1* | 7/2020 | Sorgi | G06T 7/0004 |
| 10,731,970 B2* | 8/2020 | Cao | G01S 7/4802 |
| 10,740,911 B2* | 8/2020 | Phan | G06K 9/00664 |
| 10,778,902 B2* | 9/2020 | Mori | G06T 7/70 |
| 10,957,067 B2* | 3/2021 | Yoshikawa | G06K 9/00791 |
| 11,010,920 B2* | 5/2021 | Yu | G06T 7/13 |
| 2020/0073399 A1* | 3/2020 | Tateno | G05D 1/0274 |
| 2021/0142499 A1* | 5/2021 | Watanabe | G06T 7/55 |

FOREIGN PATENT DOCUMENTS

JP   2018-206038   12/2018

* cited by examiner

*Primary Examiner* — Gregory M Desire
(74) *Attorney, Agent, or Firm* — Amin, Turocy & Watson, LLP (57) ABSTRACT

According to one embodiment, a point cloud data processing device includes a communication interface and a processor. The communication interface acquires distance data from a distance sensor. The processor generates second point cloud data by employing one point for each unit cell preset for coordinates of first point cloud data based on the distance data.

17 Claims, 7 Drawing Sheets

POINT CLOUD DATA PROCESSING DEVICE

CROSS-REFERENCE TO RELATED APPLICATION

This application is based upon and claims the benefit of priority from Japanese Patent Application No. P2019-202383, filed on Nov. 7, 2019, the entire contents of which are incorporated herein by reference.

FIELD

Embodiments described herein relate generally to a point cloud data processing device.

BACKGROUND

There is a device (point cloud data processing device) that images a commodity (article) placed on furniture having shelves by a distance sensor, acquires distance data, and generates point cloud data based on the distance data. The point cloud data is data indicating a set of points in a space (three-dimensional space) including a depth direction, a width direction, and a height direction. Each point can be represented by coordinates (x, y, and z).

Based on the point cloud data generated in this way, it is possible to detect commodities arranged on the shelf. However, when the point cloud data is generated over the entire area of the shelf, there is a problem that the data amount becomes enormous.

DETAILED DESCRIPTION

An object of the exemplary embodiment is to provide a point cloud data processing device capable of generating efficient point cloud data.

In general, according to one embodiment, a point cloud data processing device includes a communication interface and a processor. The communication interface acquires distance data from a distance sensor. The processor generates second point cloud data by employing one point for each unit cell preset for coordinates of first point cloud data based on the distance data.

Hereinafter, embodiments will be described with reference to the drawings.

Figure 1:
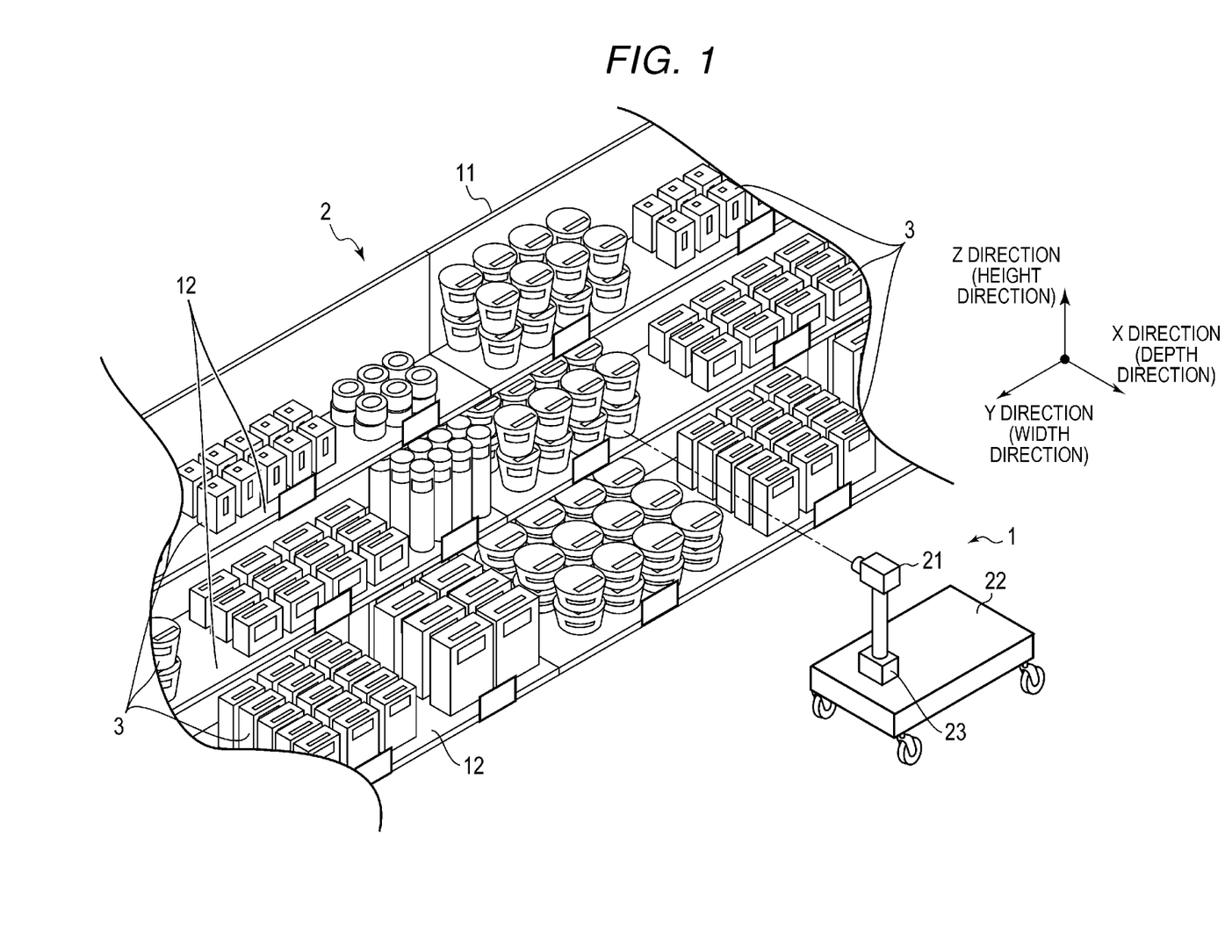
FIG. 1 is a diagram for illustrating an example of a schematic configuration of a point cloud data processing device according to an embodiment.

FIG. 1 is an explanatory diagram for illustrating an example of a schematic configuration of a point cloud data processing device 1 according to an embodiment.

The point cloud data processing device 1 images a structure such as furniture 2 for display which is installed at a predetermined place such as a store or a warehouse, and a commodity (article) 3 placed on the furniture 2.

The furniture 2 includes a backboard 11 and a shelf 12 protruding from the backboard 11.

The backboard 11 is a member constituting the furniture 2. The backboard 11 is, for example, configured in a plate shape standing upright.

The shelf 12 is a shelf board that supports the commodity 3. The shelf 12 is configured to protrude horizontally from the backboard 11, for example. Further, a shelf label describing, for example, a commodity name, a price, or various pieces of other commodity information may be provided at an end of the shelf 12 opposite to the backboard 11.

For example, the furniture 2 forms a passage with other furniture 2 which is arranged separated by a predetermined interval, a wall, or the like. The shelf 12 is configured to protrude from the backboard 11 toward the passage side. That is, the shelf label is provided toward the passage. In addition, the commodities 3 arranged on the shelf 12 are displayed such that the front of the commodity 3 (so-called face) faces the passage.

In FIG. 1, the direction in which the shelf 12 protrudes from the backboard 11 is referred to as an X direction (depth direction). A direction orthogonal to the X direction (depth direction) and parallel to the backboard 11 is referred to as a Y direction (width direction). A direction orthogonal to the X direction (depth direction) and the Y direction (width direction) is referred to as a Z direction (height direction). That is, the X direction, the Y direction, and the Z direction are orthogonal to one another.

The point cloud data processing device 1 performs imaging (acquisition of distance data) while moving in the Y direction in a state where a predetermined distance from the backboard 11 in the X direction is maintained.

Next, a detailed configuration of the point cloud data processing device 1 will be described.

The point cloud data processing device 1 includes a distance sensor 21, a moving mechanism 22, and a control device 23.

The distance sensor 21 is a sensor that measures a distance to a target object. The distance sensor 21 generates distance data indicating the distance to the target object. The distance sensor 21 supplies distance data to the control device 23.

The distance sensor 21 is configured as, for example, a stereo camera that measures the distance to the target object based on parallax when the target object is imaged from two different points (pupil positions). That is, the distance sensor 21 includes two or more cameras in which a lens (optical system) and an imaging element that converts light imaged by the lens into an image are combined. In general, the optical axis of the optical system is configured to be orthogonal to the imaging surface of the imaging element.

According to the above configuration, the distance sensor 21 uses the direction orthogonal to the imaging surface of the imaging element as a detection direction, and measures the distance to the target object for each of a plurality of points (coordinates) arranged in a direction orthogonal to the detection direction. That is, the distance sensor 21 generates distance data indicating a distance between the target object and the distance sensor 21 in the detection direction as a distance value for each coordinate.

Further, the distance sensor 21 may be configured as, for example, a laser range finder. The laser range finder irradiates an object to be measured with a laser and measures a distance to the object to be measured based on time until the reflected light is incident.

The distance sensor 21 is configured to acquire, for example, distance data of 30 frames per second. The distance data (distance image) of one frame is data (for example, 640×480 pixels) detected from within a detection range of the distance sensor 21.

The moving mechanism 22 is a device that moves the distance sensor 21 based on the control of the control device 23. The moving mechanism 22 includes, for example, a trolley (base) to which the distance sensor 21 is fixed, and a motor that rotationally drives wheels of the trolley. For example, the distance sensor 21 is fixed to the trolley so that the optical axis of the optical system is horizontal. The moving mechanism 22 moves the distance sensor 21 fixed to the trolley by driving the wheels with the motor. The moving mechanism 22 may be configured to move the base by any units such as a movable leg using a crank, or a propeller.

The control device 23 is a device that controls the operation of the distance sensor 21 and the operation of the moving mechanism 22. Further, the control device 23 performs various processes based on the distance data acquired by the distance sensor 21.

Figure 2:
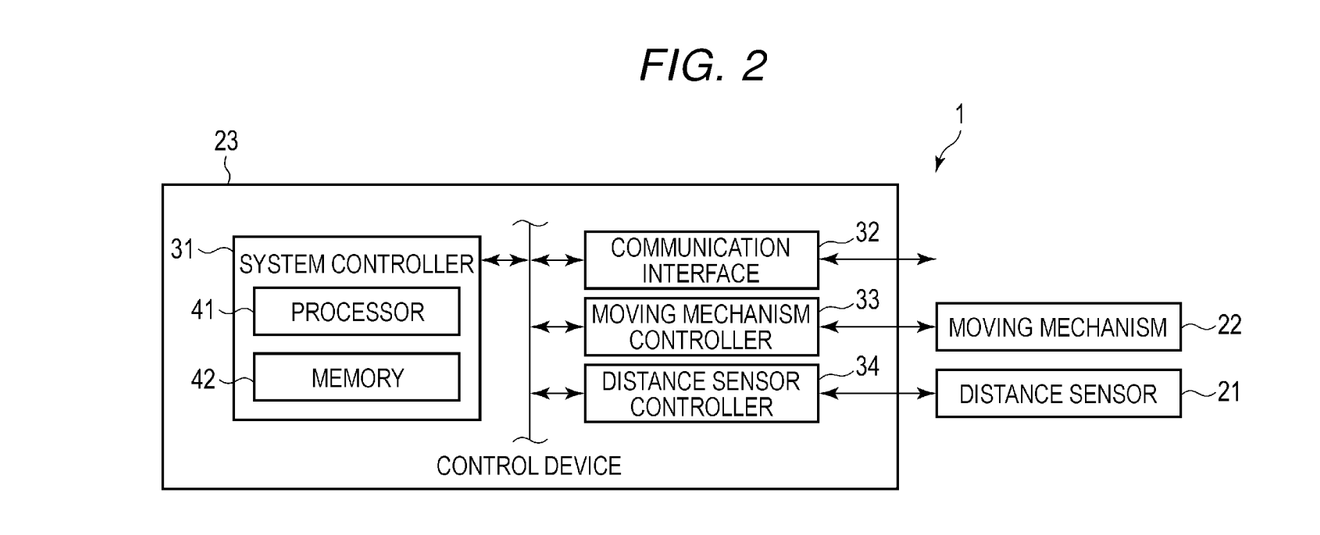
FIG. 2 is a diagram for illustrating an example of a configuration of a control device.

FIG. 2 is an explanatory diagram for illustrating a configuration example of the control device 23 of the point cloud data processing device 1.

The control device 23 includes a system controller 31, a communication interface 32, a moving mechanism controller 33, and a distance sensor controller 34.

The system controller 31 controls the point cloud data processing device 1. The system controller 31 includes, for example, a processor 41 and a memory 42.

The processor 41 is an arithmetic element that performs arithmetic processing. The processor 41 is, for example, a CPU. The processor 41 performs various processes based on data such as programs stored in the memory 42. The processor 41 functions as a control unit that can execute various operations by executing a program stored in the memory 42.

The memory 42 is a storage medium that stores a program, data used in the program, and the like. The memory 42 also functions as a working memory. That is, the memory 42 temporarily stores data being processed by the processor 41, a program executed by the processor 41, and the like.

The communication interface 32 is an interface for communicating with another device. The communication interface 32 is used, for example, for communication with a higher-level device (external device). The communication interface 32 performs wireless communication with another device according to a standard such as Bluetooth (registered trademark) or Wi-Fi (registered trademark). Further, for example, the communication interface 32 may be configured as a LAN connector or the like.

The moving mechanism controller 33 controls the moving mechanism 22. The moving mechanism controller 33 causes the moving mechanism 22 to move the distance sensor 21 based on the control of the system controller 31.

In addition, the moving mechanism 22 includes a position detection unit (not shown) for detecting a position (absolute position) of the point cloud data processing device 1 on the map, a relative position (relative position) thereof with respect to the backboard 11 of the furniture 2, or a relative position (relative position) thereof with respect to the shelf 12 of the furniture 2. The moving mechanism 22 can recognize the direction in which the trolley is directed by the position detection unit. The position detection unit may be, for example, any units such as a laser range finder, a GPS, or image processing based on an image captured by a camera, or the like. The position of the point cloud data processing device 1 is recognized as, for example, coordinates in the X direction and the Y direction.

Since the position of the distance sensor 21 on the trolley and the detection direction of the distance sensor 21 are at the base, the moving mechanism controller 33 or the processor 41 can specify the position of the distance sensor 21 and the detection direction of the distance sensor 21, respectively, based on the detection result of the position detection unit.

The distance sensor controller 34 controls the distance sensor 21. The distance sensor controller 34 causes the distance sensor 21 to execute imaging based on the control of the system controller 31.

Next, the operation of the point cloud data processing device 1 will be described.

Figure 3:
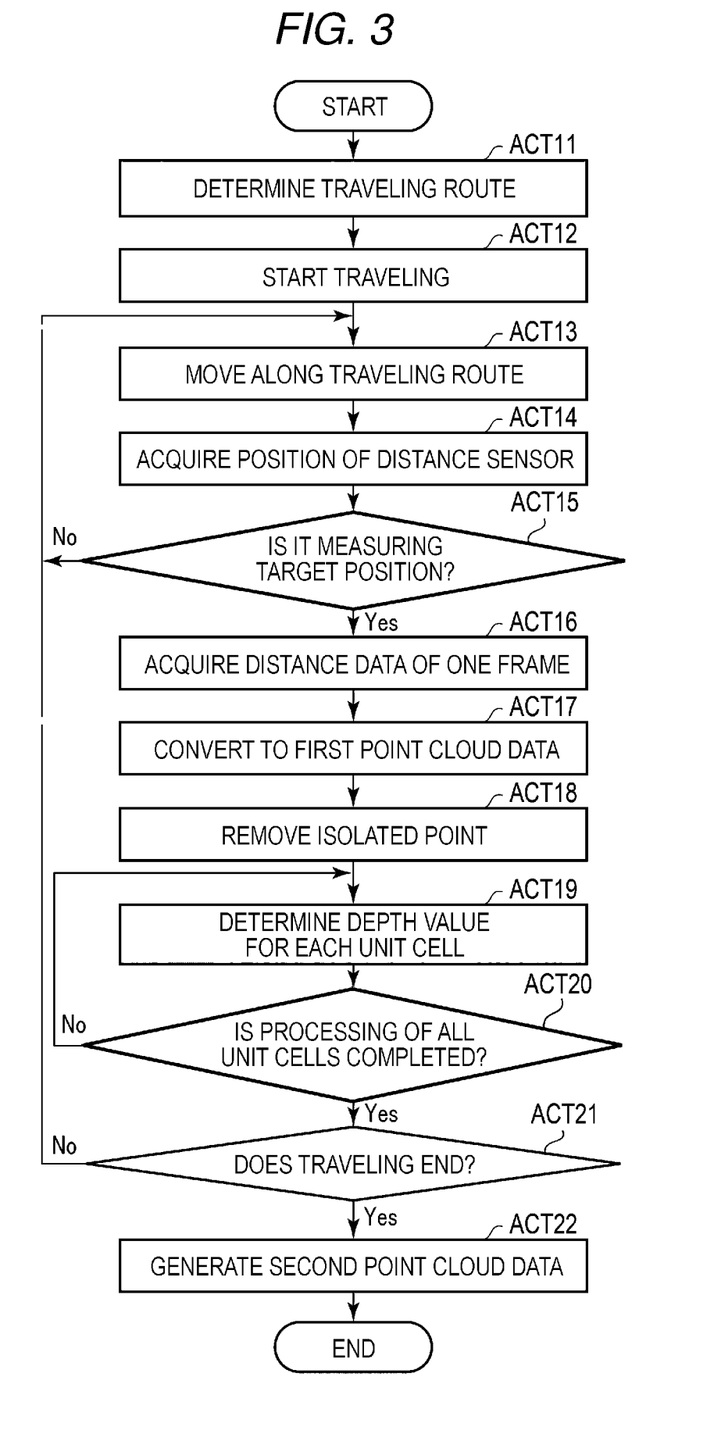
FIG. 3 is a diagram for illustrating an example of an operation of the point cloud data processing device according to the embodiment.

FIG. 3 is a flowchart for illustrating the operation of the point cloud data processing device 1.

The processor 41 of the system controller 31 of the point cloud data processing device 1 determines a traveling route to be used (ACT 11). It is assumed that a plurality of traveling routes are stored in the memory 42 or the moving mechanism controller 33 in advance. In addition, the memory 42 or the moving mechanism controller 33 stores a map of a predetermined place such as a store or a warehouse in advance. The map shows the position of the furniture 2 (coordinates in the X direction and the Y direction). Each traveling route is information indicating a route from a position at which imaging by the distance sensor 21 starts to a position at which imaging ends. In addition, each traveling route includes information on a plurality of measurement target positions at which imaging is performed by the distance sensor 21. Each traveling route may be information based on a position on a map of a store floor, may be information based on the position of the furniture 2 or another installed object, or may be information based on GPS or the like. The processor 41 may be configured to determine one traveling route from the plurality of traveling routes in the memory 42 in accordance with an operation of an operation interface (not shown). Further, the processor 41 may be configured to determine a traveling route in a preset order among the plurality of traveling routes in the memory 42.

The processor 41 controls the moving mechanism 22 and the moving mechanism controller 33 to start traveling based on the determined traveling route (ACT 12). The processor 41 controls the moving mechanism 22 and the moving mechanism controller 33 so that the distance sensor 21 moves in the horizontal direction in parallel with the backboard 11 of the furniture 2. In this case, the processor 41 controls the direction of the distance sensor 21 with the moving mechanism 22 and the moving mechanism controller 33 so that the detection direction of the distance sensor 21 (that is, the optical axis of the camera of the distance sensor 21) is orthogonal to the backboard 11 of the furniture 2. Further, a mechanism for adjusting the direction of the distance sensor 21 may be provided on the trolley of the moving mechanism 22.

The processor 41 controls the moving mechanism controller 33 so that the point cloud data processing device 1 moves based on the determined traveling route (ACT 13).

The processor 41 controls the moving mechanism controller 33 so that the distance sensor 21 moves on the determined traveling route while confirming the position and the detection direction of the distance sensor 21 of the point cloud data processing device 1 by the position detection unit (ACT 14). In this case, the processor 41 controls so that the detection direction is close to the direction orthogonal to the backboard 11 of the furniture 2.

The processor 41 determines whether or not the point cloud data processing device 1 reaches the measurement target position on the determined traveling route (ACT 15). If the processor 41 determines that the point cloud data processing device 1 does not reach the measurement target position on the determined traveling route (ACT 15, NO), the processor 41 shifts to ACT 13 and controls the moving mechanism controller 33 to continue the moving by the moving mechanism 22.

If the processor 41 determines that the point cloud data processing device 1 reaches the measurement target position on the determined traveling route (ACT 15, YES), the processor 41 controls the distance sensor 21 to acquire (one) distance data for one frame (ACT 16). The distance sensor 21 generates distance data indicating the distance between the target object and the distance sensor 21 in the detection direction as a distance value for each coordinate. The coordinates of the distance data are coordinates on a plane orthogonal to the detection direction (optical axis) of the distance sensor 21. That is, the distance data is data indicating a distance value between the distance sensor 21 and the target object in the detection direction of the distance sensor 21 for each coordinate lined in a direction orthogonal to the detection direction of the distance sensor 21.

The processor 41 converts the distance data acquired by the distance sensor 21 into point cloud data (first point cloud data) (ACT 17).

The point cloud data is data indicating a set of points in a space (three-dimensional space) including a depth direction (a direction orthogonal to the backboard 11), a width direction, and a height direction. That is, the point cloud data in this example indicates a set of points arranged in a three-dimensional space including the X directions, the Y directions, and the Z direction. Each point can be represented by coordinates (x, y, and z).

The processor 41 calculates a relative position of the distance sensor 21 with respect to the backboard 11 of the furniture 2 based on the position of the distance sensor 21 acquired in ACT 14. Thereby, the processor 41 calculates a difference between the detection direction of the distance sensor 21 and the direction orthogonal to the backboard 11. Further, the processor 41 converts the distance data into point cloud data (first point cloud data) based on the difference between the calculated detection direction of the distance sensor 21 and the orthogonal direction with respect to the backboard 11, and the relative position of the distance sensor 21 with respect to the backboard 11 of the furniture 2. That is, the processor 41 converts the distance value for each coordinate of the distance data into coordinates in a three-dimensional space including the X direction, the Y direction, and the Z direction. That is, the processor 41 generates the first point cloud data by plotting points at positions in the X direction corresponding to each distance value of the distance data for each coordinate arrayed in the Y direction and the Z direction. As a result, the first point cloud data based on the backboard 11 is generated.

Figure 4:
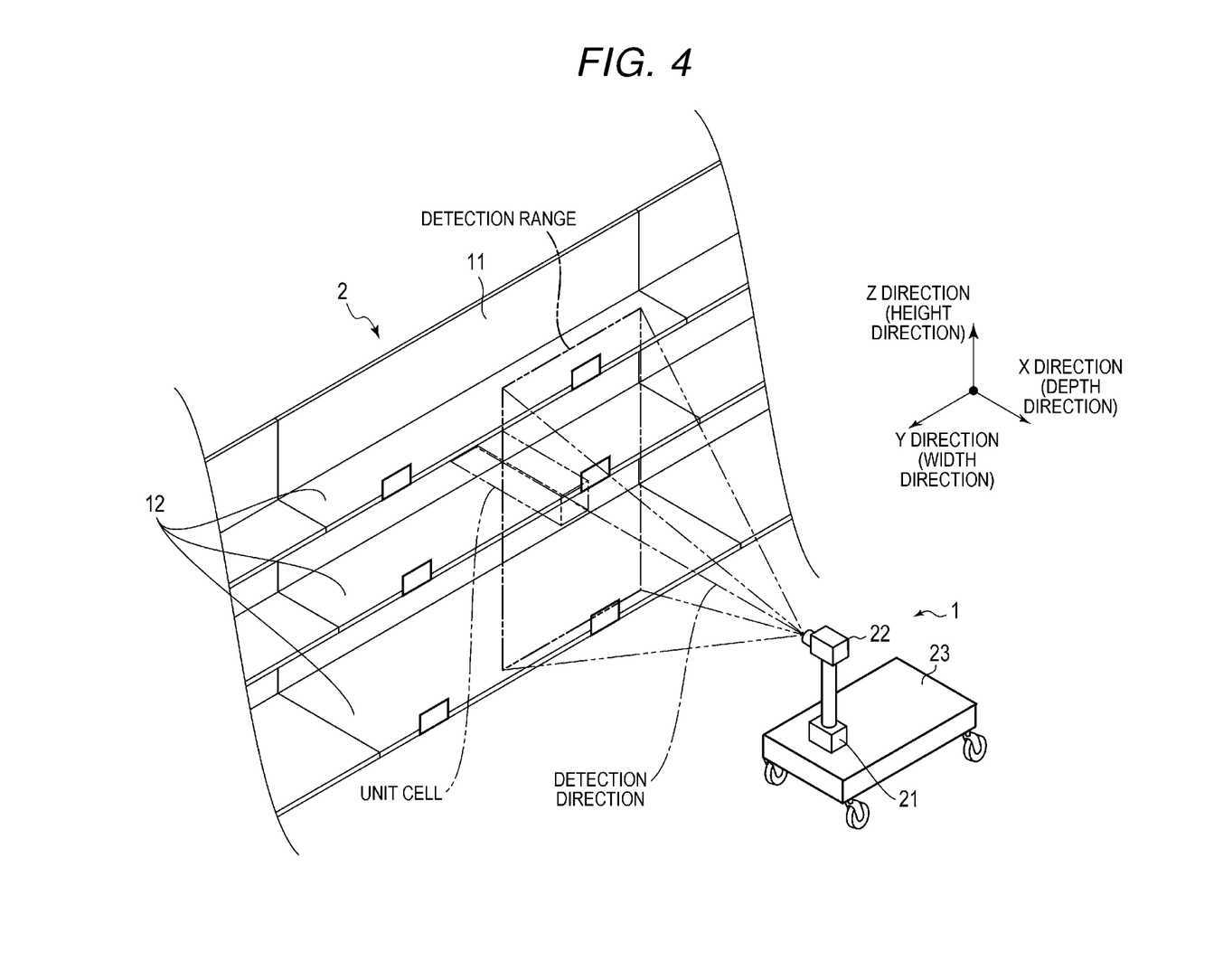
FIG. 4 is a diagram for illustrating another example of the operation of the point cloud data processing device according to the embodiment.

FIG. 4 is an explanatory diagram for illustrating the traveling direction of the point cloud data processing device 1 and the detection direction and detection range of the distance sensor 21. In the example of FIG. 4, the description will be made on the assumption that the detection direction of the distance sensor 21 coincides with the direction (X direction) orthogonal to the backboard 11.

According to the example of FIG. 4, the point cloud data processing device 1 continuously acquires distance data while moving in the Y direction parallel to and horizontal to the backboard 11. The range (detection range) from which the distance data of the distance sensor 21 can be acquired is determined by the optical system and the imaging element constituting the distance sensor 21.

Next, the processor 41 removes isolated points from the first point cloud data generated based on the distance data of one frame (ACT 18). This is a process for removing noise in the first point cloud data. For example, the processor 41 specifies a point (isolated point) whose distance from another point is equal to or larger than a preset threshold in the first point cloud data and removes the isolated point from the first point cloud data. Specifically, the processor 41 determines, for each point of the first point cloud data, whether or not another point exists within a predetermined radius, and specifies a point where another point does not exist as an isolated point. Also, the processor 41 may generate a histogram based on the coordinates of the first point cloud data in the X direction, and specify a point whose frequency is less than a predetermined value in the generated histogram as an isolated point.

Since the first point cloud data generated as described above is based on the resolution according to the resolving power of the distance sensor 21, the amount of information is enormous. However, in order to detect the commodities arranged on the shelf, at least the position in the X direction is necessary to be known for each commodity. For this reason, the point cloud data processing device 1 generates second point cloud data by compressing the information amount of the first point cloud data according to the application.

First, the processor 41 determines a depth value (coordinate in the X direction) for each unit cell (ACT 19). The processor 41 generates second point cloud data by employing one point for each unit cell preset for the coordinates on the first point cloud data. For example, the processor 41 employs, for each unit cell, a point having the largest distance (the coordinate in the X direction is large) from the backboard 11 in the direction orthogonal to the backboard 11 among the points in the first point cloud data. Further, the processor 41 removes other points in the unit cell.

The unit cell is a space that has a plurality of coordinates in the first point cloud data and is formed over the entire area of the first point cloud data in the X direction (depth direction). That is, the unit cell is a space in which an area parallel to the backboard 11 is extended to the entire area of the first point cloud data in the X direction (depth direction). For example, the unit cell is a space in which an area determined by the coordinates of two points on the plane of the Y direction and the Z direction is extended to the entire area of the first point cloud data in the X direction (depth direction). Further, for example, the unit cell may be a space in which an area having any shape on the plane of the Y direction and the Z direction is extended to the entire area of the first point cloud data in the X direction (depth direction). The unit cell may be set in advance.

Figure 5:
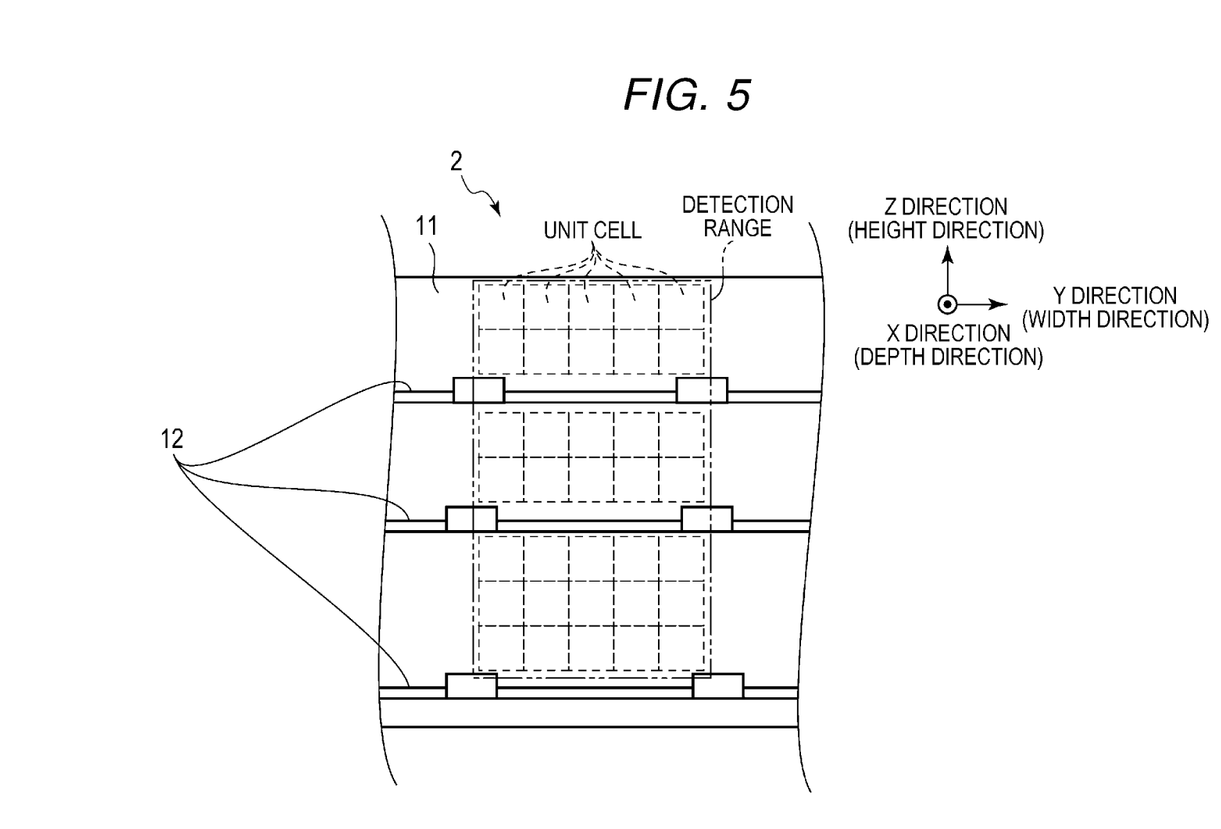
FIG. 5 is a diagram for illustrating still another example of the operation of the point cloud data processing device according to the embodiment.

FIG. 5 is an explanatory diagram for illustrating an example of setting a unit cell. For example, the unit cells are arranged to avoid positions such as the shelf 12 and the price tag. For example, the unit cells are arranged in a range from a position above a lower shelf board by a predetermined length to a position below an upper shelf board by a predetermined length. Further, the processor 41 may be configured to detect the shelf 12 based on the distance data and sequentially determine the position of the unit cell based on the detected position of the shelf 12.

The processor 41 determines whether or not the processing of all the unit cells is completed (ACT 20). If the processor 41 determines that the processing of all the unit cells is not completed (ACT 20, NO), the processor 41 shifts to the process of ACT 19, and executes a process of determining a point to be employed for the next unit cell. That is, the processor 41 executes a process of determining a point to be employed for all unit cells. The processor 41 may remove points not included in the unit cell in the first point cloud data.

Further, if the processor 41 determines that the processing of all unit cells is completed (ACT 20, YES), the processor 41 determines whether or not traveling based on the traveling route ends (ACT 21). If the processor 41 determines that the traveling based on the traveling route does not end (ACT 21, NO), the processor 41 shifts to ACT 13 and controls the moving mechanism controller 33 to continue the moving by the moving mechanism 22. Thereby, the processor 41 acquires the first point cloud data from the entire area of the furniture 2 while moving.

If the processor 41 determines that the traveling based on the traveling route ends (ACT 21, YES), the processor 41 ends the acquisition of distance data by the distance sensor 21, generates second point cloud data (ACT 22), and ends the processing in FIG. 3.

The processor 41 combines a plurality of pieces of first point cloud data generated based on the distance data of the plurality of frames acquired while moving to generate second point cloud data. For example, the processor 41 superimposes the plurality of pieces of first point cloud data by shifting the coordinates in the Y direction according to the difference between the positions of the distance sensor 21 at the time of acquiring the respective pieces of distance data. Further, if there are a plurality of points for each of the coordinates in the Y direction and the Z direction (or for each unit cell), the processor 41 employs a point having a large coordinate in the X direction and removes the other points to generate second point cloud data. Thereby, the processor 41 can generate the second point cloud data over the entire surface of the shelf 12 of the furniture 2.

The processor 41 determines whether or not the commodities arranged on the shelf 12 are sufficient based on the generated second point cloud data. For example, based on the second point cloud data, the processor 41 detects a state where the backboard 11 is visible (a state where commodities are not arranged on the shelf 12) and outputs the result to another device. If the value of the depth is less than a preset threshold, the processor 41 detects that the number of commodities arranged on the shelf 12 is small and outputs the result to another device. Further, for example, the processor 41 may perform a labeling process of combining unit cells having similar depth values (coordinates in the X direction) before the above process. Further, the processor 41 may be configured to output the second point cloud data to a device that determines whether or not the commodities arranged on the shelf 12 are sufficient.

As described above, the processor 41 of the point cloud data processing device 1 employs the point having the largest distance from the backboard 11 for each unit cell preset for the coordinates in the first point cloud data to generate the second point cloud data. Thereby, the processor 41 can detect the commodities arranged on the shelf and can generate the point cloud data with a reduced data amount. As a result, the point cloud data processing device 1 can generate efficient point cloud data.

The point cloud data processing device 1 further includes the distance sensor 21 and the moving mechanism 22 that moves the distance sensor 21. In this case, the processor 41 converts the distance data acquired by the distance sensor 21 while moving by the moving mechanism 22 into first point cloud data. Further, the processor 41 generates second point cloud data by reducing the data based on the unit cell for the first point cloud data and combining the plurality of pieces of first point cloud data. Thereby, the point cloud data processing device 1 can generate the second point cloud data over the entire surface of the shelf 12.

Next, another example regarding the acquisition of distance data and generation of first point cloud data will be described.

In the above example, it is described that the processor 41 converts the distance data acquired by the distance sensor 21 into first point cloud data and combines the converted first point cloud data, but the processor 41 is not limited to this configuration. The processor 41 may be configured to convert the distance data acquired by the distance sensor 21 into first point cloud data and to combine a part of the converted first point cloud data.

Generally, the resolution (contrast) of an optical system of a camera is reduced due to various aberrations of a lens constituting the optical system. The reduction in contrast tends to increase with distance from the optical axis. For this reason, sufficient resolution may not be obtained at the corners of the image obtained by the camera.

Figure 6:
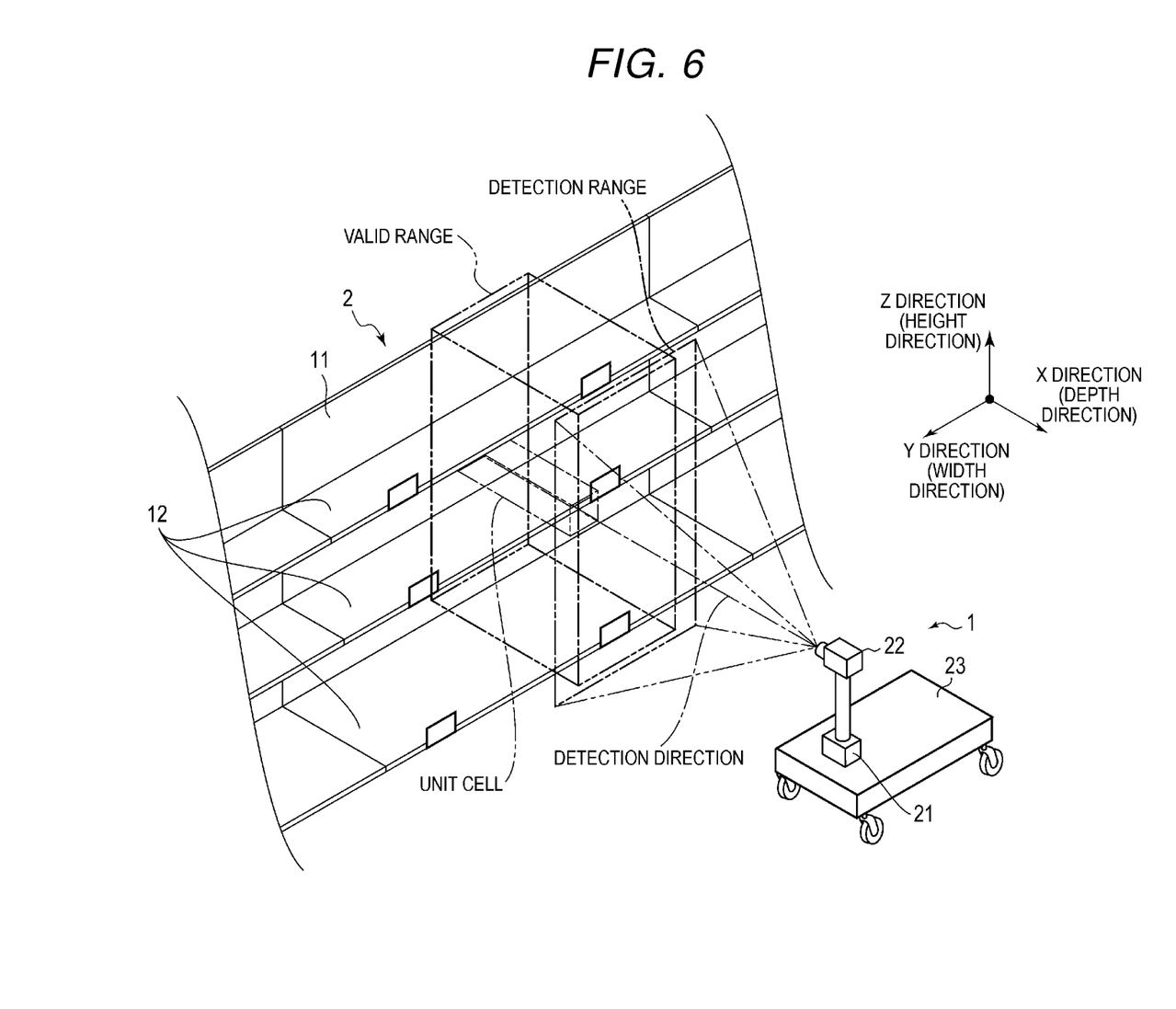
FIG. 6 is a diagram for illustrating still another example of the operation of the point cloud data processing device according to the embodiment.

FIG. 6 is an explanatory diagram for illustrating a valid range (clipping area) smaller than the detection range of the distance sensor 21. According to the example of FIG. 6, the point cloud data processing device 1 continuously obtains distance data while moving in the Y direction parallel to and horizontal to the backboard 11. The distance sensor 21 supplies data corresponding to the inside of the valid range of the distance data to the system controller 31. That is, the distance sensor 21 performs clipping for removing a part of the distance data and supplies the clipped data to the system controller 31.

In this case, the processor 41 generates first point cloud data based on the distance data within the valid range supplied from the distance sensor 21. That is, the processor 41 generates the first point cloud data using a part of the distance data acquired by the distance sensor 21, performs data removal using the unit cell for the plurality of pieces of first point cloud data, and combines the data to generate second point cloud data of the entire surface of the shelf 12. According to such a configuration, the accuracy of the point cloud data can be improved.

The processor 41 may be configured to generate first point cloud data using all the distance data acquired by the distance sensor 21 and remove points corresponding to distance data outside the valid range from the generated first point cloud data.

Further, the distance sensor 21 of the point cloud data processing device 1 may be configured to downsample the distance data and supply the downsampled distance data to the system controller 31.

Figure 7:
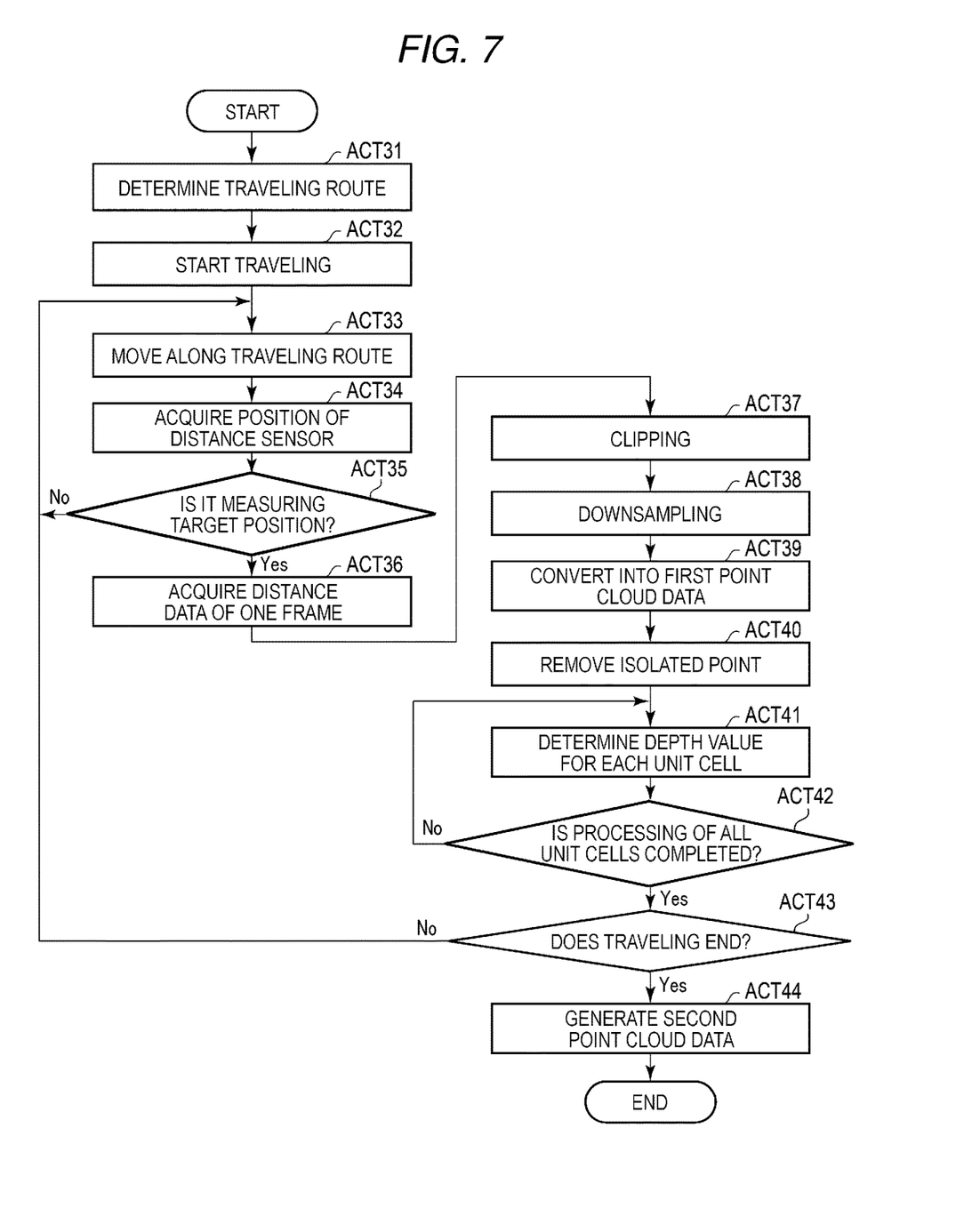
FIG. 7 is a diagram for illustrating still another example of the operation of the point cloud data processing device according to the embodiment.

FIG. 7 is a flowchart for illustrating the operation of the point cloud data processing device 1 when the valid range setting and downsampling are performed.

The processor 41 of the system controller 31 of the point cloud data processing device 1 determines a traveling route to be used (ACT 31).

The processor 41 controls the moving mechanism 22 and the moving mechanism controller 33 to start traveling based on the determined traveling route (ACT 32).

The processor 41 controls the moving mechanism controller 33 to move the point cloud data processing device 1 based on the determined traveling route (ACT 33).

The processor 41 controls the moving mechanism controller 33 so that the distance sensor 21 moves on the determined traveling route while confirming the position and the detection direction of the distance sensor 21 of the point cloud data processing device 1 by the position detection unit (ACT 34). In this case, the processor 41 performs control so that the detection direction is close to the direction orthogonal to the backboard 11 of the furniture 2.

The processor 41 determines whether or not the point cloud data processing device 1 reaches the measurement target position on the determined traveling route (ACT 35). If the processor 41 determines that the point cloud data processing device 1 does not reach the measurement target position on the determined traveling route (ACT 35, NO), the processor 41 shifts to ACT 33 and controls the moving mechanism controller 33 to continue the moving by the movement mechanism 22.

If the processor 41 determines that the point cloud data processing device 1 reaches the measurement target position on the determined traveling route (ACT 35, YES), the processor 41 controls the distance sensor 21 to acquire (one) distance data for one frame (ACT 36).

The distance sensor 21 clips the acquired distance data (ACT 37). That is, the distance sensor 21 removes other data while leaving a part corresponding to the valid range.

The distance sensor 21 downsamples the clipped distance data and supplies the downsampled distance data to the processor 41 of the system controller 31 (ACT 38). For example, the distance sensor 21 determines the resolution after downsampling based on the control from the system controller 31. Specifically, it is assumed that the vertical resolution of the distance sensor 21 is 1080 p and the horizontal resolution after downsampling is set to 320 p. In this case, the distance sensor 21 converts distance data having a vertical resolution of 1080 p into distance data having a vertical resolution of 320 p.

The processor 41 converts the distance data supplied from the distance sensor 21 into point cloud data (first point cloud data) (ACT 39).

Next, the processor 41 removes isolated points from the first point cloud data generated based on the distance data of one frame (ACT 40).

The processor 41 determines a depth value (coordinate in the X direction) for each unit cell preset for the coordinates of the first point cloud data (ACT 41).

The processor 41 determines whether or not the processing of all the unit cells is completed (ACT 42). If the processor 41 determines that the processing of all the unit cells is not completed (ACT 42, NO), the processor 41 shifts to the process of ACT 41 and executes a process of determining the depth value for the next unit cell. That is, the processor 41 executes a process of determining a depth value for all unit cells. The processor 41 may remove points not included in the unit cell in the first point cloud data.

If the processor 41 determines that the process for determining the depth value is completed for all the unit cells (ACT 42, YES), the processor 41 determines whether or not traveling based on the traveling route ends (ACT 43). If the processor 41 determines that the traveling based on the traveling route does not end (ACT 43, NO), the processor 41 shifts to ACT 33 and controls the moving mechanism controller 33 to continue the moving by the moving mechanism 22. Thereby, the processor 41 acquires the first point cloud data from the entire area of the furniture 2 while moving.

If the processor 41 determines that the traveling based on the traveling route ends (ACT 43, YES), the processor 41 ends the acquisition of distance data by the distance sensor 21, generates second point cloud data (ACT 44), and ends the processing in FIG. 7.

As described above, the point cloud data processing device 1 does not employ a low-accuracy area in the distance data, and generates first point cloud data by downsampling. As a result, it is possible to prevent the generation of point cloud data with insufficient accuracy and to reduce the load of processing such as removal of isolated points and setting of the depth of a unit cell. As a result, a point cloud data processing device capable of generating efficient point cloud data can be provided.

In the above embodiment, it is described that the point cloud data processing device converts the downsampled distance data into the first point cloud data, but the point cloud data processing device is not limited to this configuration. The point cloud data processing device may be configured to convert distance data into first point cloud data and then downsample the data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A point cloud data processing device, comprising:
   a communication interface configured to acquire distance data from a distance sensor; and
   a processor configured to generate second point cloud data by employing one point for each unit cell preset for coordinates of first point cloud data based on the distance data,
   wherein the processor employs, for each unit cell, a point with a largest distance from a backboard in a direction orthogonal to the backboard of a structure including the backboard and a shelf that protrudes from the backboard and supports an article, among the points in the first point cloud data, and wherein the unit cells are arranged to avoid positions such as the shelf.

2. The device according to claim 1, further comprising:
   the distance sensor; and
   a moving mechanism configured to move the distance sensor,
   wherein the processor generates the second point cloud data based on a plurality of pieces of the first point cloud data acquired by the distance sensor while moving by the moving mechanism.

3. The device according to claim 2,
   wherein the processor uses a part of each of the plurality of pieces of the first point cloud data to generate the second point cloud data.

4. The device according to claim 2,
   wherein the plurality of pieces of the first point cloud data acquired by the distance sensor are captured at different locations by the distance sensor.

5. The device according to claim 1,
wherein the unit cell is a space in which an area parallel to the backboard is extended to an entire area in the direction orthogonal to the backboard.

6. The device according to claim 1,
wherein the processor removes an isolated point in the first point cloud data and uses the first point cloud data from which the isolated point is removed to generate the second point cloud data.

7. A point cloud data processing method, comprising:
acquiring, by a distance sensor, distance data;
generating, by a processor, second point cloud data by employing one point for each unit cell preset for coordinates of first point cloud data based on the distance data, and
employing, for each unit cell, a point with a largest distance from a backboard in a direction orthogonal to the backboard of a structure including the backboard and a shelf that protrudes from the backboard and supports an article, among the points in the first point cloud data, and wherein the unit cells are arranged to avoid positions such as the shelf.

8. The method according to claim 7, further comprising:
moving the distance sensor; and
generating the second point cloud data based on a plurality of pieces of the first point cloud data acquired by the distance sensor while moving the distance sensor.

9. The method according to claim 8, further comprising:
using a part of each of the plurality of pieces of the first point cloud data to generate the second point cloud data.

10. The method according to claim 8, further comprising:
removing an isolated point in the first point cloud data and using the first point cloud data from which the isolated point is removed to generate the second point cloud data.

11. The method according to claim 8, further comprising:
capturing the plurality of pieces of the first point cloud data acquired by the distance sensor at different locations by the distance sensor.

12. A point cloud data processing system, comprising:
a distance sensor configured to generate distance data of an object;
a moving mechanism configured to move the distance sensor;
a communication interface configured to acquire distance data from the distance sensor; and
a processor configured to generate second point cloud data by employing one point for each unit cell preset for coordinates of first point cloud data based on the distance data,
wherein the processor employs, for each unit cell, a point with a largest distance from a backboard in a direction orthogonal to the backboard of a structure including the backboard and a shelf that protrudes from the backboard and supports an article, among the points in the first point cloud data, and wherein the unit cells are arranged to avoid positions such as the shelf.

13. The system according to claim 12, further comprising:
wherein the processor generates the second point cloud data based on a plurality of pieces of the first point cloud data acquired by the distance sensor while moving by the moving mechanism.

14. The system according to claim 12,
wherein the processor uses a part of each of the plurality of pieces of the first point cloud data to generate the second point cloud data.

15. The system according to claim 12,
wherein the unit cell is a space in which an area parallel to the backboard is extended to an entire area in the direction orthogonal to the backboard.

16. The system according to claim 12,
wherein the processor removes an isolated point in the first point cloud data and uses the first point cloud data from which the isolated point is removed to generate the second point cloud data.

17. The system according to claim 12,
wherein the plurality of pieces of the first point cloud data acquired by the distance sensor are captured at different locations by the distance sensor.

* * * * *